Oct. 21, 1952　　　　F. BERRY　　　　2,614,503
MULTICYLINDER ROTARY ABUTMENT HYDRAULIC POWER CONVERTER
Filed Oct. 25, 1949　　　　9 Sheets-Sheet 2

INVENTOR
FRANK BERRY
BY
Donald W. Robertson
ATTORNEY

Oct. 21, 1952     F. BERRY     2,614,503
MULTICYLINDER ROTARY ABUTMENT HYDRAULIC POWER CONVERTER
Filed Oct. 25, 1949     9 Sheets-Sheet 4

INVENTOR
FRANK BERRY
BY
Donald W. Robertson
ATTORNEY

Oct. 21, 1952 F. BERRY 2,614,503
MULTICYLINDER ROTARY ABUTMENT HYDRAULIC POWER CONVERTER
Filed Oct. 25, 1949 9 Sheets-Sheet 5
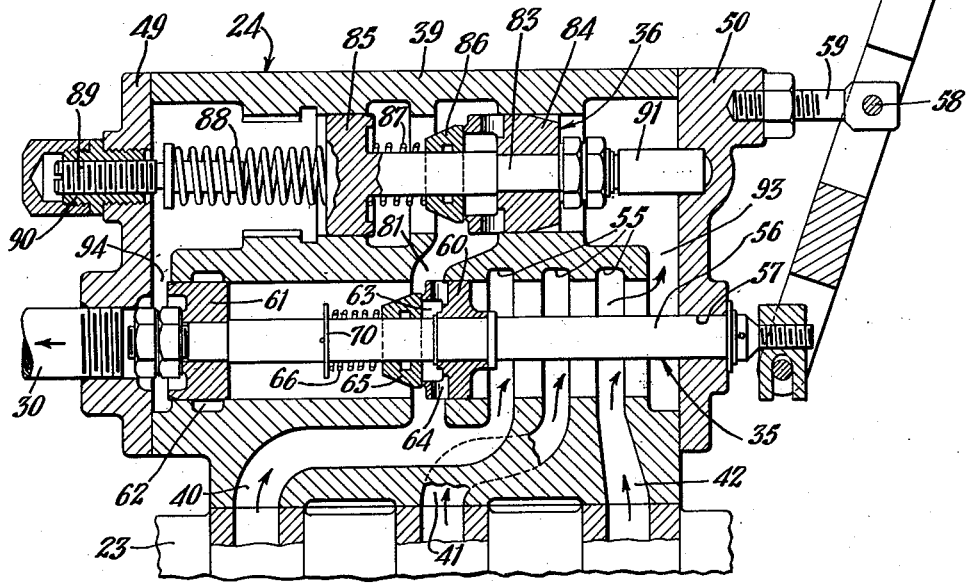
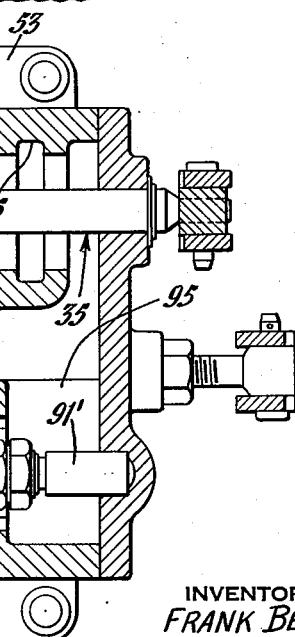
INVENTOR
FRANK BERRY
BY
ATTORNEY

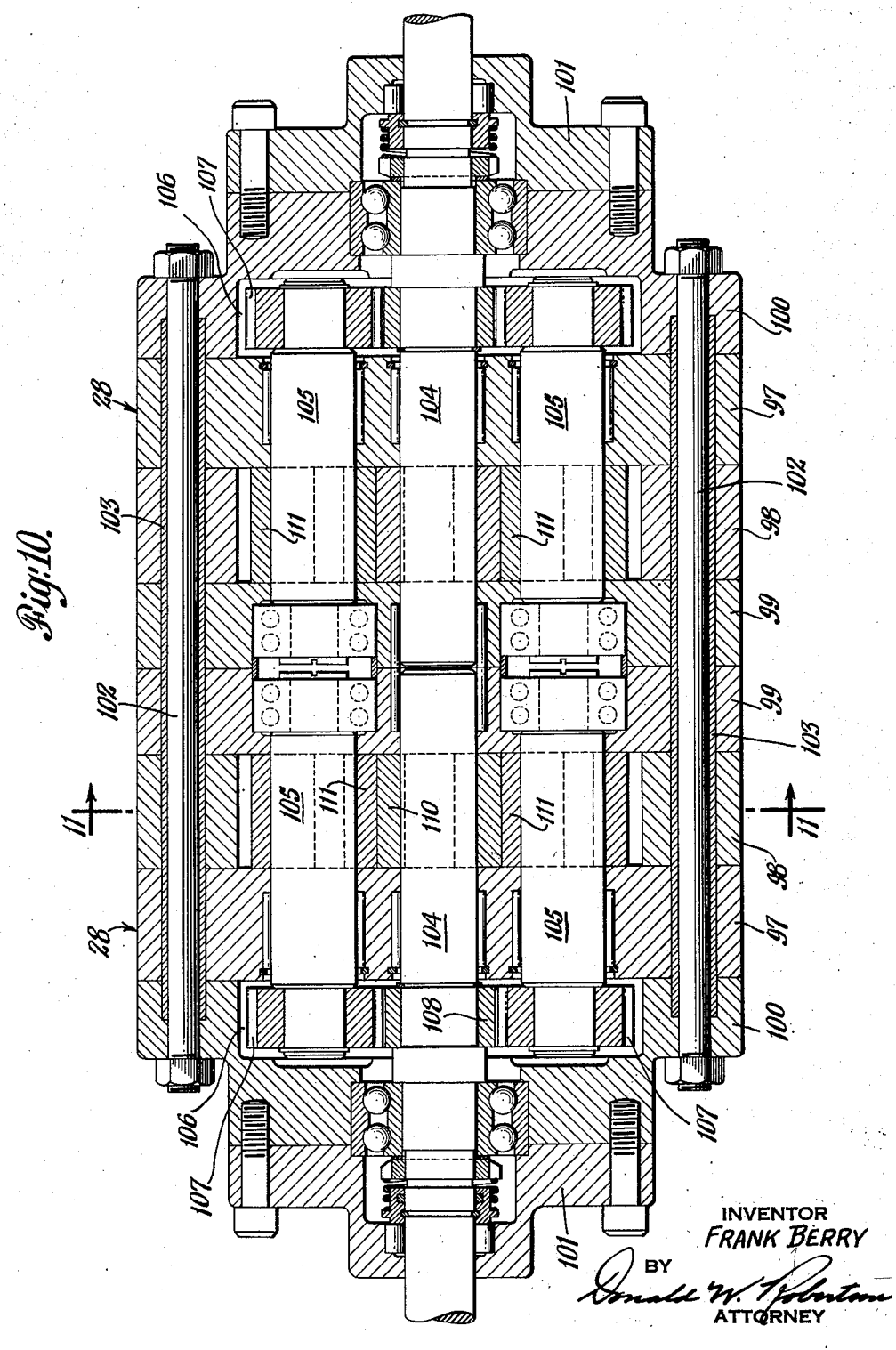

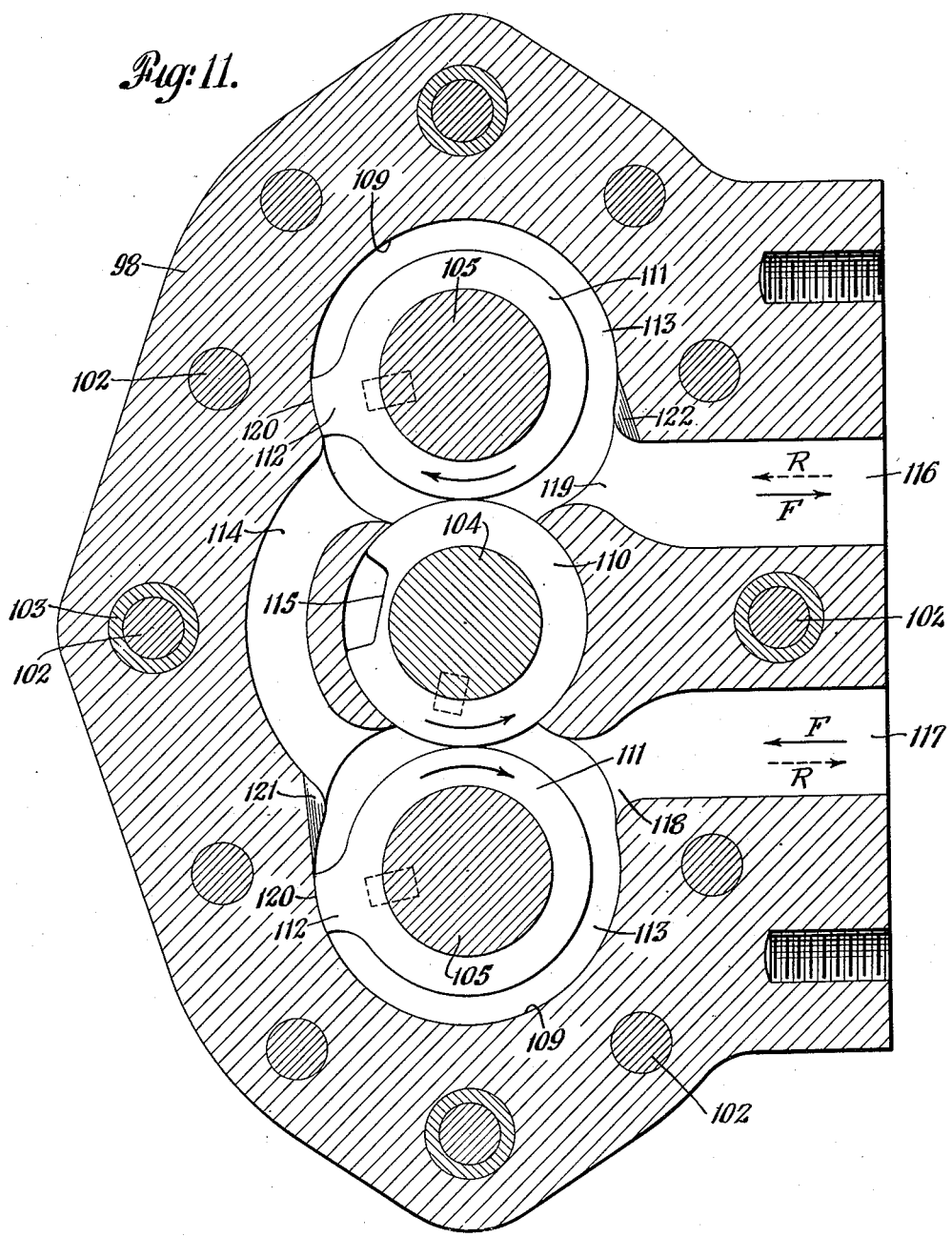

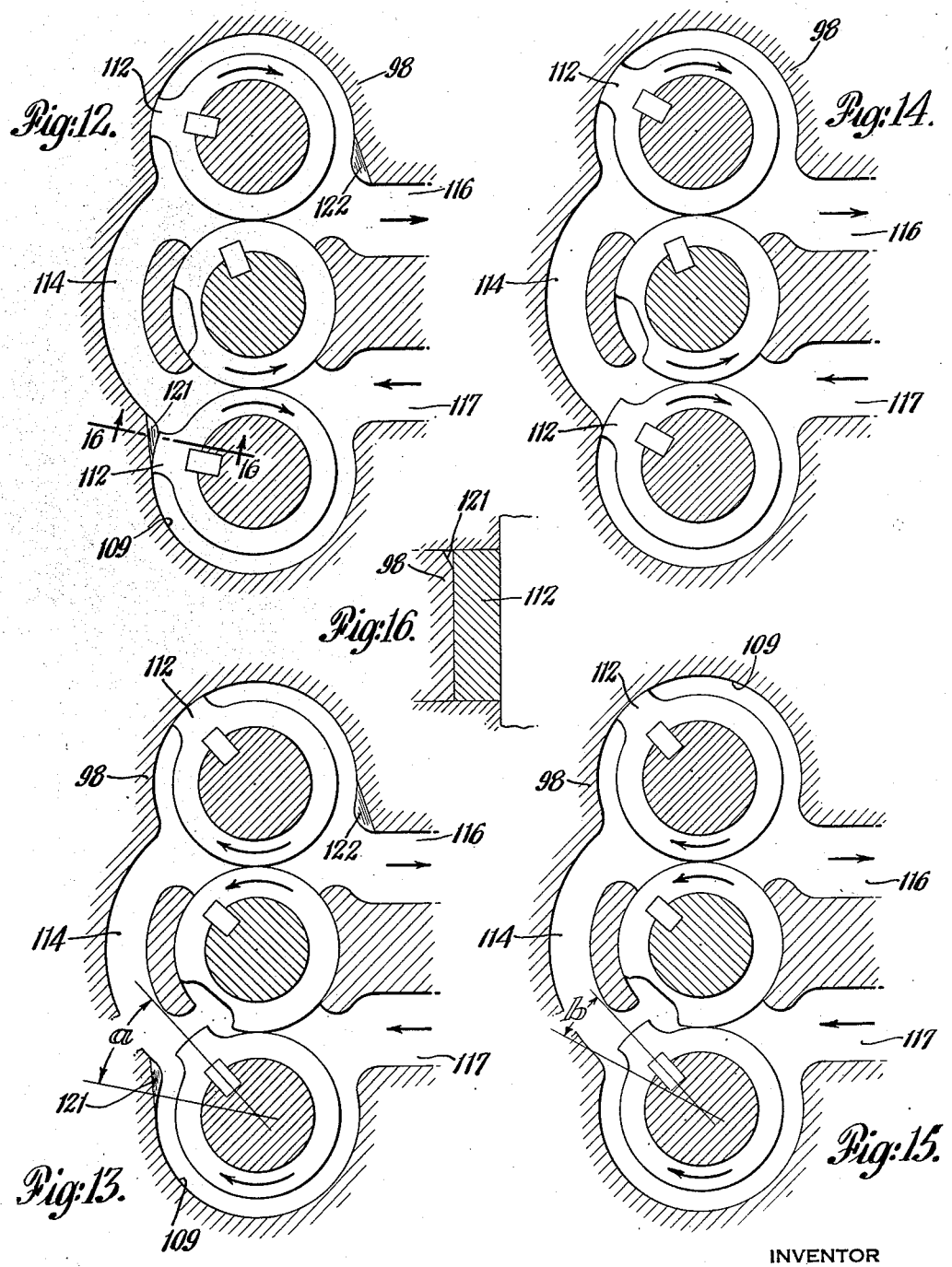

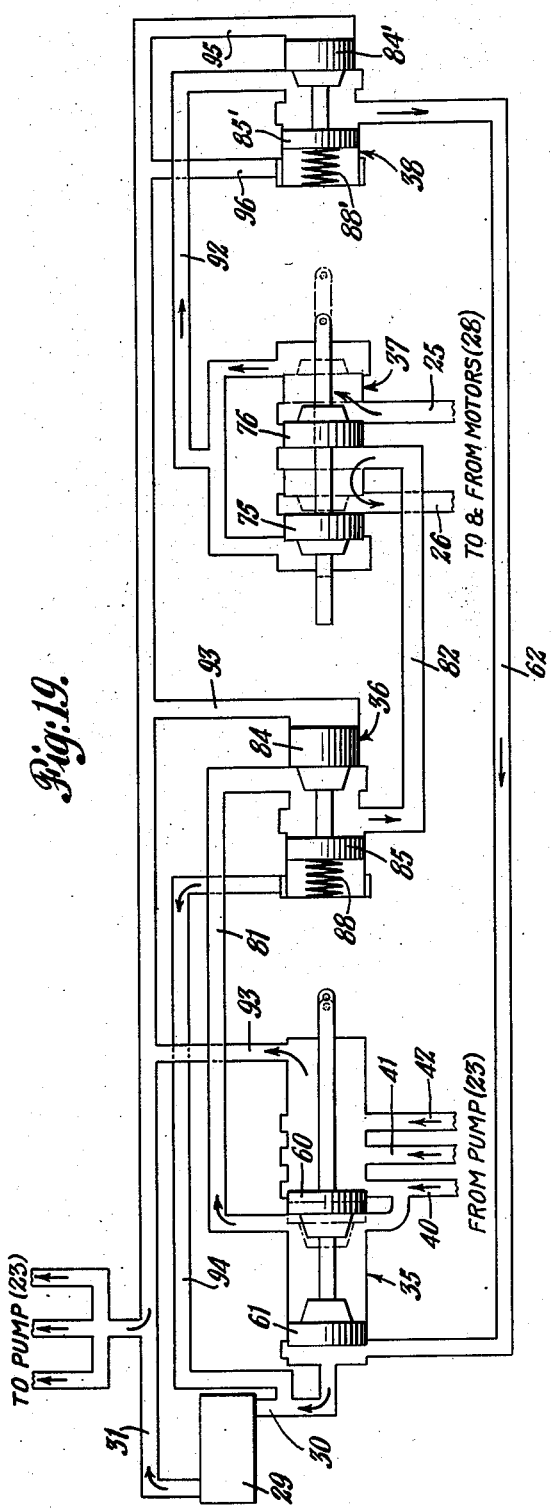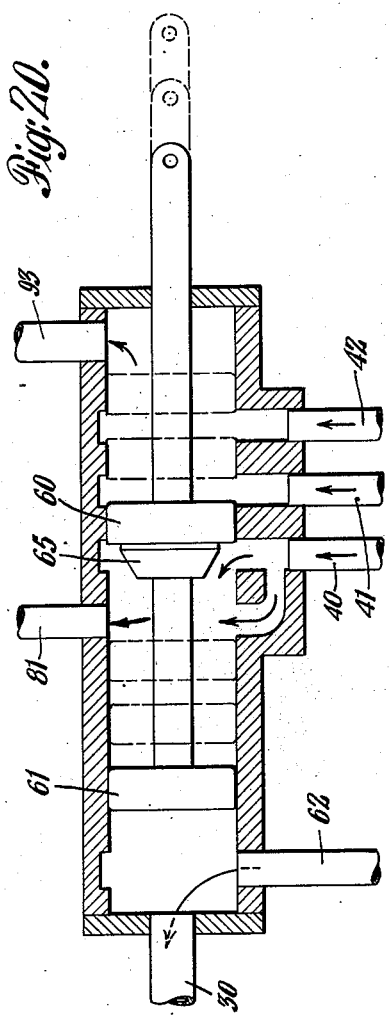

Patented Oct. 21, 1952

2,614,503

UNITED STATES PATENT OFFICE 2,614,503

MULTICYLINDER ROTARY ABUTMENT HYDRAULIC POWER CONVERTER

Frank Berry, Corinth, Miss., assignor, by mesne assignments, to Oliver Iron and Steel Corporation, Pittsburgh, Pa., a corporation of Pennsylvania Application October 25, 1949, Serial No. 123,503

10 Claims. (Cl. 103—125)

1

The invention relates to hydraulic power converters of the rotary abutment type having two or more annular cylinders connected in series. It is applicable to hydraulic pumps, motors and transmissions, and hydraulic rotary power devices in general.

Summary

According to my invention, as applied to multicylinder hydraulic devices of the class described, having a fluid passage connecting the outlet of one annular cylinder to the inlet of another annular cylinder, the pistons of such cylinders so connected and the connected outlet and inlet being constructed and arranged as follows: with the piston of said one annular cylinder in a position in which its sealing surface is contiguous to a surface of its annular cylinder and with the leading edge of the piston opposite the edge of the outlet, the piston of said other annular cylinder is in a position in which its sealing surface is contiguous to a surface of its annular cylinder and with the trailing edge of the piston opposite the edge of the inlet so that said one piston begins to lose its full sealing effectiveness with its cylinder just as said other piston acquires its full sealing effectiveness with its cylinder, whereby the action of the pistons is blended to reduce pulsation. Otherwise defined, the one piston begins to unseal its cylinder substantially at the moment that the other piston has been brought into full sealing relationship with its cylinder.

The invention is applicable to hydraulic power devices of the class described irrespective of whether the adjacent annular cylinders are arranged in line, with a common shaft for the piston rotors (i. e. of the general type illustrated in my prior patent, No. 2,464,481, granted March 15, 1949), or whether the cylinders are arranged in the same plane as in the "pancake" type of unit which has been chosen to illustrate what I now consider to be the best embodiment of the present invention. In the "pancake," or coplanar, unit the abutment valve may be arranged between the two adjacent cylinders with its axis parallel to the piston rotor shafts of the cylinders, and this valve may have a single recess to clear each of the pistons in turn. One piston emerges from its cylinder substantially at the same time that the other piston enters its cylinder so that the action of the pistons is blended to reduce pulsation.

Another important feature of my invention is that the connection from the one cylinder to the aforesaid connecting fluid passage is relieved by

2 a small cut-back over a portion of the contiguous sealing surfaces of the piston and cylinder which reduces the extent of the sealing contact between such contiguous sealing surfaces so that the action of the piston is smoothed out to reduce pulsation further. This has the effect of extending the angular displacement of the piston between the point at which opening of the connection between the cylinder and passage begins to take place and the point at which full opening is reached. The cut-back may be formed as a narrow tapering channel in the surface of the cylinder, or in the surface of the piston, or both, and a similar cut-back may be provided for the outlet of each of the cylinders.

My invention has special application to multicylinder rotary abutment hydraulic units in which the cylinders are arranged in series, i. e. with the outlet of one cylinder connected to the inlet of the adjacent cylinder as distinguished from a parallel arrangement in which all cylinders are connected to common inlet and outlet manifolds. Of course it is applicable also to multiple units in which a number of units having series-connected cylinders are arranged in parallel. In this case it is the units which are parallel-connected, and the invention finds application to the series-connected cylinders of each unit. Heretofore it has been thought desirable with series-connected cylinders to have the power stroke of each piston in its cylinder as long as possible with view to achieving a substantial overlapping action of the pistons in adjacent connected cylinders. I have in the past subscribed to this view, or have been led to a similar conclusion as a result of my training and experience. I concluded that with an extended overlap between the power strokes of adjacent series-connected cylinders, leakage past one piston would produce smaller loss of efficiency due to the "backing up" action of the seal between the next piston and its cylinder which is operating simultaneously during a considerable part of its working stroke by reason of the aforesaid extended overlap. I have now discovered, however, that by eliminating the overlap it is possible to greatly reduce, if not substantially eliminate, pulsation, and further, that the increase in efficiency resulting from this improvement equals or betters the increase in efficiency formerly attributed to the backing up action of overlapping piston strokes. Elimination or reduction of pulsation is the sine qua non of hydraulic pumps, motors and transmissions, and it is this which constitutes the primary object of my invention.

In the case of two-cylinder units a particularly noticeable improvement is obtained due to elimination of the very substantial overlap between the action of the two pistons. In the case of three-cylinder in-line units improvement may result from eliminating a condition under which the leading piston begins to lose its full sealing effectiveness in advance of the point at which the third piston will acquire its full sealing effectiveness. In any multi-cylinder series unit, improvement is obtained due to smoothing out the valving action of the pistons as they emerge from their respective cylinders, for I have discovered that the valving action of a series of pistons bears an important relationship to the valving action of the rotary abutment, or abutments.

Other objects and advantages will appear as the description proceeds.

*Description*

In the drawings I have illustrated the application of my invention to an hydraulic drive for railway motor cars. Features of the invention, in what I consider at the present time to represent the best embodiment thereof, are utilized in the hydraulic pump, the hydraulic wheel motors, and the control unit of this hydraulic drive. The invention is useful in the construction of any of these units apart from the others, but has added advantages as employed in the complete transmission of automotive vehicles in general.

Figure 3:
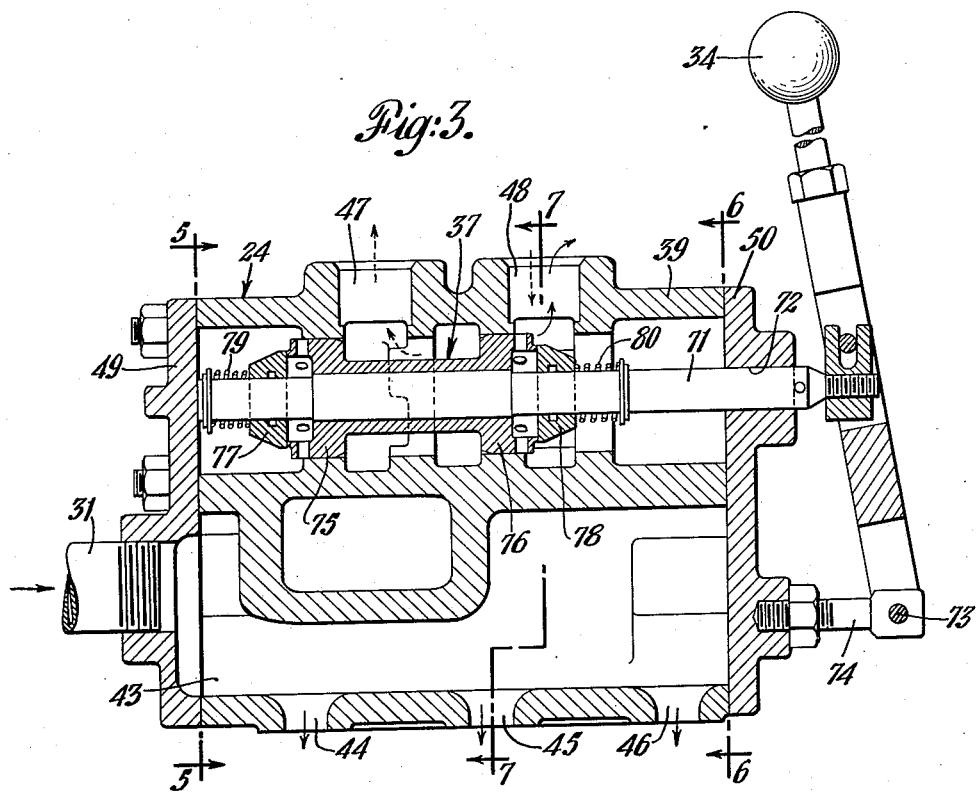
Fig. 3 is a central vertical longitudinal cross-sectional view of the control unit of the transmission, taken as indicated at 3—3 in Fig. 6.
Figure 4:
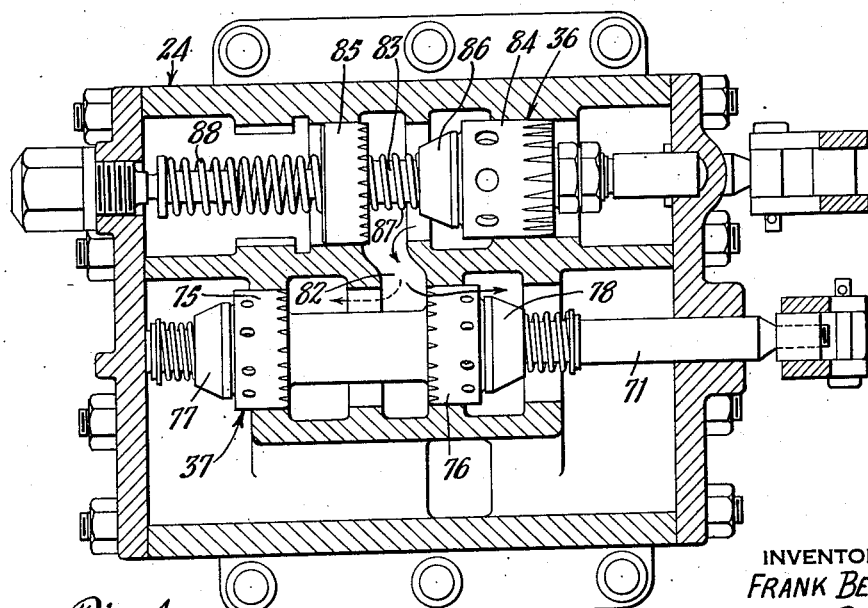
Figure 5:
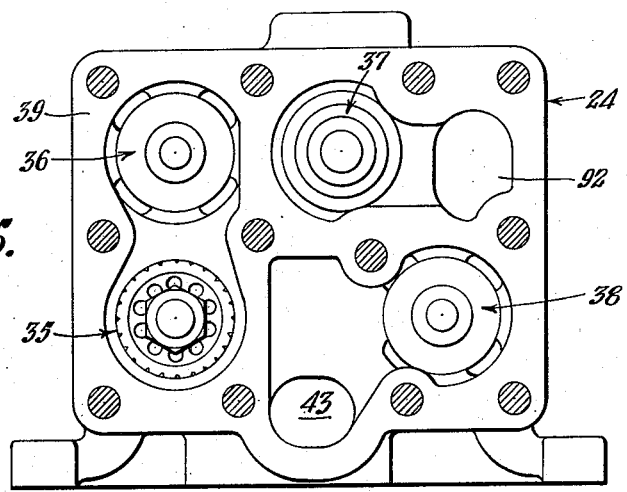
Figure 6:
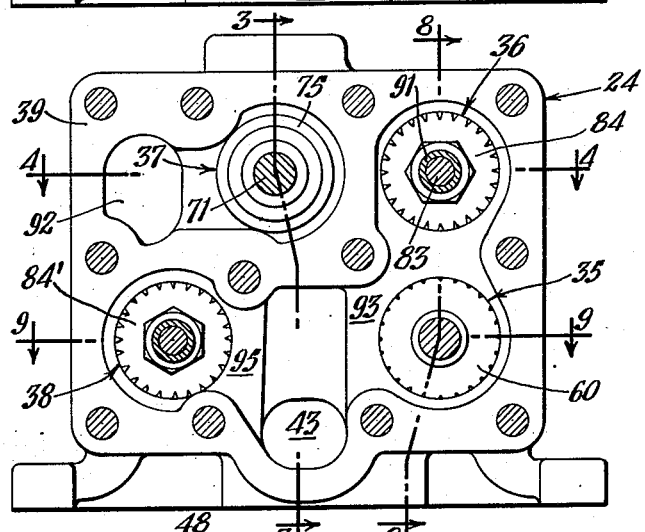
Figure 7:
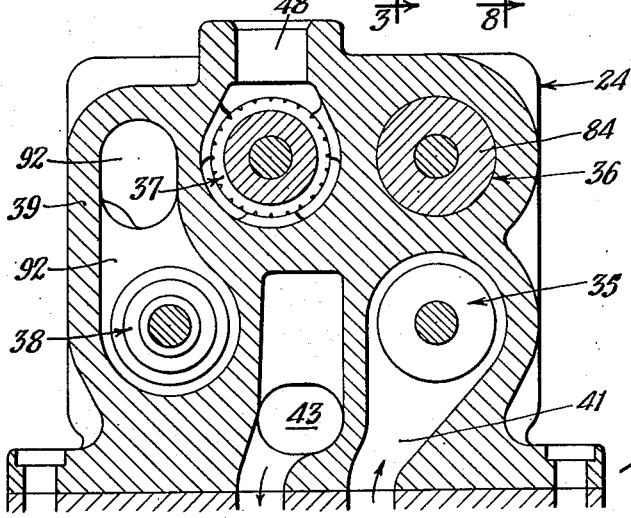

Figs. 4 to 9, inclusive, are further views of the control unit, Fig. 4 being a horizontal cross-sectional view taken as indicated at 4—4 in Fig. 6. Figs. 5, 6 and 7 are transverse vertical cross-sectional views taken as indicated at 5—5, 6—6, and 7—7, respectively, in Fig. 3. Fig. 8 is a vertical longitudinal cross-sectional view taken as indicated at 8—8 in Fig. 6, and Fig. 9 is a horizontal cross-sectional view taken as indicated at 9—9 in Fig. 6. In all of these views the control valve of the unit is shown in its braking position, and the reversing valve in its reverse position.

Figure 1:
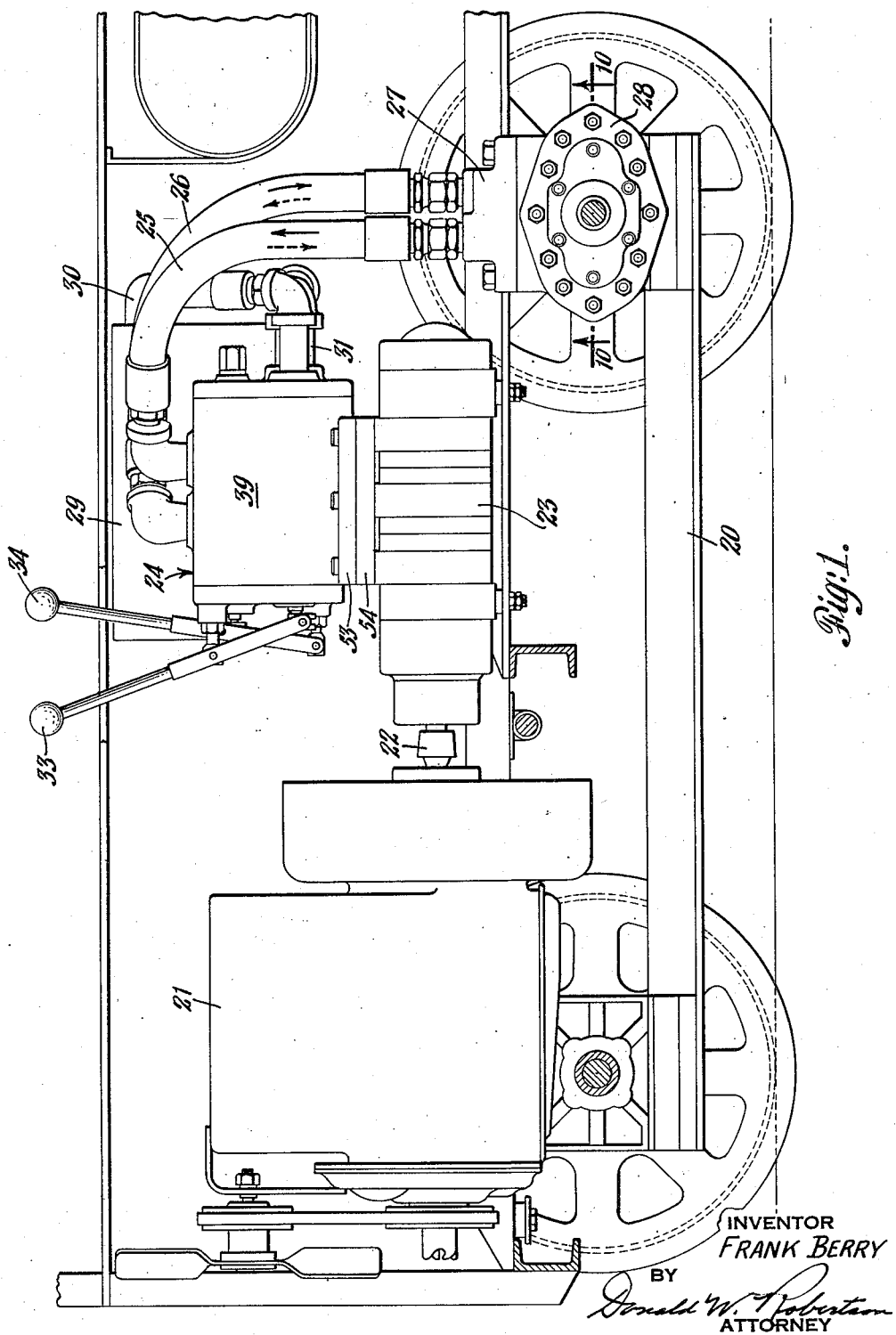
Fig. 1 is a side elevational view of a railway motor car embodying the complete hydraulic transmission.

Fig. 10 is an enlarged central horizontal sectional view through the hydraulic wheel motors taken as indicated at 10—10 in Fig. 1.

Fig. 11 is a vertical transverse sectional view through one of the wheel motors, taken as indicated at 11—11 in Fig. 10. This view is representative also of the pump of the hydraulic drive, the same construction being applicable alike to hydraulic pumps and hydraulic motors with little or no variation since an hydraulic pump operated in reverse becomes an hydraulic motor. That is, when the shafts of the piston rotors (or one of them) are driven, we have a pump regardless of the direction of rotation, and when the pistons are driven by fluid from a source of pressure so that the shafts of the piston rotors become drive shafts, we have a motor—again regardless of the direction of rotation. In the first case mechanical force is converted to fluid pressure, whereas in the latter case fluid pressure is converted to mechanical force. This likeness of hydraulic pumps and motors is well known, and I mention it here simply to make it clear that Fig. 11 (and succeeding figures to be described) is illustrative of the application of my invention to either type of power converter.

Figs. 12 to 15, inclusive, are somewhat diagrammatic cross-sectional views through adjacent annular cylinders of hydraulic devices of the class described. Fig. 12 shows a device embodying the cut-back porting feature of my invention, the piston of the lower cylinder being in the position in which it is about to emerge from its cylinder at the conclusion of a power stroke. Fig. 13 shows the same device, but with the position of the movable parts slightly advanced from that shown in Fig. 12 so that the piston of the lower cylinder has just reached the point at which the outlet of that cylinder is fully open and in communication with the fluid passage connecting said outlet to the inlet of the other cylinder. Figs. 14 and 15 are comparative views illustrating the effect of omitting the cut-back porting of Figs. 12 and 13, Fig. 14 showing the piston of the lower cylinder in emerging position, and Fig. 15 showing the same piston at the point at which the outlet of the cylinder is fully open.

Fig. 16 is a detail cross-sectional view of the cut-back in the cylinder wall for smoothing out the action of the piston as it leaves its cylinder. This view is taken as indicated at 16—16 in Fig. 12.

Figure 17:
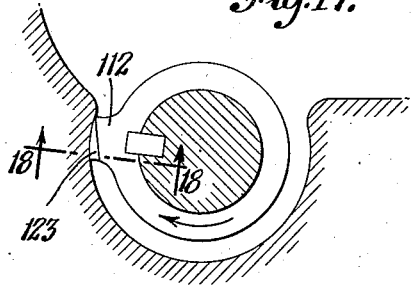
Figure 18:
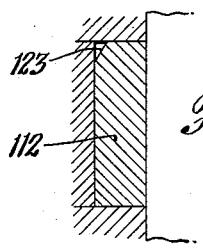

Fig. 17 is a detail cross-sectional view through one of the cylinders of a motor or pump illustrating a modification of the invention in which the cut-back consists of a tapered channel or tapered edge in the piston; and Fig. 18 is a detail cross-sectional view taken as indicated at 18—18 in Fig. 17.

Fig. 19 is a schematic diagram of the complete hydraulic transmission of Figs. 1 to 11, inclusive.

Fig. 20 is a diagrammatic view of the control valve of the same transmission.

Figure 2:
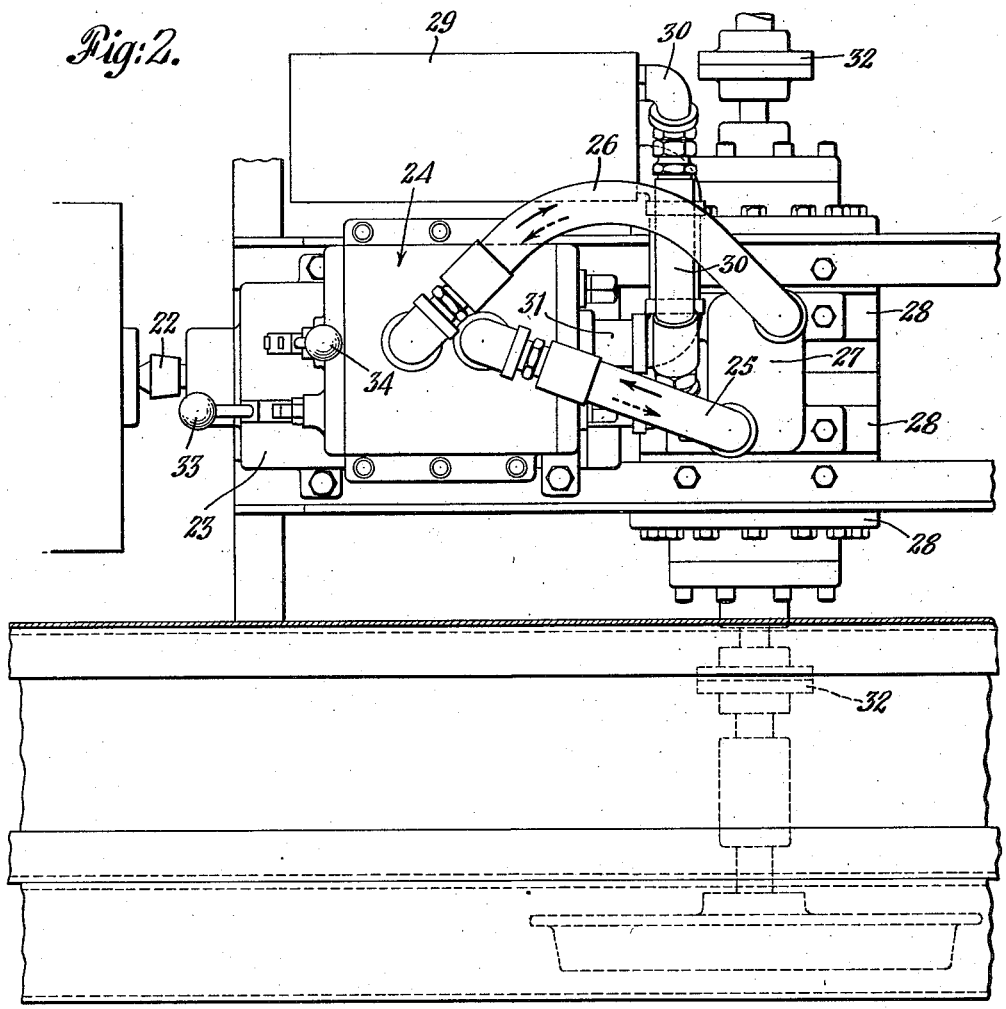
Fig. 2 is a plan view of the transmission and some of the related parts of the same motor car.

Referring to Figs. 1 and 2, illustrating the application of my invention to an hydraulic drive for a railway motor car indicated generally by the reference numeral 20, an internal combustion engine 21, or other prime mover, has its drive shaft coupled at 22 to the driven shaft of hydraulic pump 23. The fluid discharge from pump 23 is connected through a control unit 24, inlet-outlet conduits 25, 26, and manifold 27, to the fluid inlets of a pair of wheel motors 28, 28 arranged back to back. The driven shaft or shafts of the wheel motors preferably are direct-connected to the axles of one pair of the flanged wheels of the car, as by couplings 32, 32. An oil cooler and/or accumulator 29 is connected to the control unit 24 by inlet and outlet conduits 30, 31, respectively.

The control unit 24 is partly automatic but includes also manual controls comprising a control valve operated by hand lever 33 and a reversing valve operated by hand lever 34. Other parts of the general arrangement shown in Figs. 1 and 2 are of conventional construction well known to those familiar with the manufacture of railway motor cars and do not require detailed description here, the principal purpose of Figs. 1 and 2 being merely to show the interrelation of my hydraulic pump and motors in conjunction with the control unit of my hydraulic drive as employed in this or similar automotive transmissions. The complete drive system, and the individual pump, motor and control units, or features embodied therein, have application to the general automotive field including not only railway motor cars but also locomotives, automobiles, tractors, aircraft, marine propulsion, etc.

The pump 23 and motors 28 are of the form usually referred to as the rotary abutment type of unit, as illustrated for example in my prior Patent No. 2,464,481, granted March 15, 1949, but embody further improvements which I will describe herein, and which relate more particularly to novel features of multi-cylinder hydraulic pumps, motors and transmissions having a shaft disposed centrally with respect to the annular cylinders, a piston slidably received in each of the cylinders and fixed to the shaft, and a cylindrical abutment with a recess to clear each of the pistons.

Before describing the power converter improvements, consideration of the hydraulic drive as a whole will be facilitated by first describing the control unit 24 by which the operation of the pump 23 and motors 28 is correlated. For this purpose reference is now made to Figs. 3 to 9 inclusive, 19 and 20 of the drawings. The diagrammatic showing of Fig. 19 reveals the manner in which the four valves of the control unit are interconnected, these four valves being (1) the control valve 35, (2) the pump relief valve 36, (3) the reversing valve 37, and (4) the brake or motor relief valve 38. Control valve 35 and reversing valve 37 are manually operated but embody certain features of automatic operation as well. The pump relief valve 36 and the brake relief valve 38 are wholly automatic in operation.

In my preferred construction as here illustrated, these four valves are compactly arranged with parallel axes in a unitary housing, the body 39 of which may conveniently be made as a single casting. The form of this body casting is shown in detail in Figs. 3 to 9 inclusive and comprises four parallel bores for valves 35, 36, 37 and 38, connecting passages therebetween, high pressure inlet passages 40, 41 and 42 to receive the fluid discharge from the three respective cylinder sections of the pump 23, suction manifold 43 (Fig. 3) with outlets 44, 45 and 46 leading to the intakes of the three cylinder sections of the pump, and inlet-outlet ports 47, 48 connecting the bore of reversing valve 37 with inlet-outlet conduits 25 and 26 respectively leading to manifold 27 of the wheel motors 28, to which reference has already been made. The valve bores, fluid passages and ports of the body 39 of the valve, when made as a casting, are formed with the use of cores in accordance with conventional foundry techniques followed by the usual machining and/or finish grinding of the valve bores, and the end and bottom surfaces for engagement with cover plates 49, 50 and the top of pump 23. Cover plate 49 has threaded openings 51, 52 for connection to conduits 30 and 31 leading to and from the oil cooler 29. Cover plates 49 and 50 are secured to the body of the casting as by means of the stud bolts and nuts clearly shown in the drawings, and the control unit is secured to the pump in suitable fashion as by means of machine screws passing through flanges 53, 53 on the valve body 39 and engaging complementary flanges 54, 54 of pump 23, the pump being mounted on the frame of the car in any convenient manner.

The construction of control valve 35 is shown in Figs. 8 and 9. The bore of this valve is enlarged adjacent its connection to the high pressure passages 40, 41 and 42 from the pump, as at 55. The valve itself comprises a stem 56 which passes through an opening 57 in cover plate 50 for connection to the lower end of hand lever 33, this lever being pivoted at 58 to a stud 59 fixed to the cover plate. Fixed to the valve stem 56 are a pair of pistons 60, 61. The piston 60 controls the discharge from pump 23, and piston 61 controls the braking action by opening and closing passage 62 through which the fluid passes on its return from the wheel motors 28 to the oil cooler 29 and back into the suction manifold 43 of the pump 23. In Figs. 8 and 9 the control valve is shown in its braking position in which the fluid returning from the wheel motors is prevented from flowing directly into the conduit 30 for return to the pump via the oil cooler. The braking action and the manner in which it is modified to insure smooth operation will be described more fully hereinbelow. Piston 60 is recessed at 63 to form a chamber connected to a series of openings 64 around the periphery of the piston. An auxiliary relief valve 65 normally seals one end of chamber 63, being held thereagainst by compression spring 66 seating against a washer 70 which may be fixed to valve stem 56.

Referring now to Figs. 3 and 4, it will be observed that the reversing valve 37 is of a construction somewhat similar to that of the control valve just described. It has a stem 71 extending through opening 72 in cover plate 50 for connection to valve lever 34 pivotally mounted at 73 to the outside of the unit as by means of a stud 74 in the cover plate. Fixed to the valve stem are a pair of pistons 75, 76, the construction of which is substantially the same as piston 60 already described, except that in this case the two pistons are formed integrally (as a matter of convenience), and the auxiliary relief valves 77, 78 and their respective compression springs 79, 80 are disposed outwardly of the pistons instead of inwardly thereof.

High pressure fluid from the output side of the control valve 35 passes through pump relief valve 36 on its way to the reversing valve 37, 37. The connection from the output side of the control valve to the pump relief valve is shown at 81 (Fig. 8) and that between the pump relief valve and the reversing valve is shown at 82 (Fig. 4). The pump relief valve comprises a stem 83 to which is fixed a pair of pistons 84, 85. Piston 84 is of a construction similar to piston 60 previously described, having an auxiliary relief valve 86 with a compression spring 87 arranged between it and piston 85. Piston 85 is of a slightly greater effective area than piston 84; for example, in a thirty hp. unit for a railway motor car drive, piston 85 has a diameter of 1.9000 inch, while piston 84 has a diameter of 1.8750 inch. This creates a pressure differential tending to move the valve to the left as viewed in Figs. 4, 8 and 19, against the action of compression spring 88. Suitable means are provided for adjusting the initial compression of spring 88, such as the adjustable screw 89 threaded in sleeve 90 which in turn has a threaded engagement with cover plate 49. At the other end of the valve a stop 91 is fixed to cover plate 50, and when the unit is idling or under low pressure, spring 88 holds the valve in the position shown in Figs. 4 and 8 in which its end is against the stop.

Fluid returning from motors 28 through reversing valve 37 enters passage 92 connecting both ends of the reversing valve to the brake or motor relief valve 38. The construction and arrangement of this valve is, or may be, identical with the construction and arrangement of the pump relief valve 36, pistons 84 and 85 of valve 36 having their counterparts in pistons 84' and 85' of valve 38. The fluid discharged from valve 38 normally flows through passage 62, control valve 35, conduit 30, cooler 29 and conduit 31 to the suction manifold 43 of pump 23.

*Operation of control unit*

Assuming that the car is at a standstill with motor 21 running and brakes applied, with the parts in the positions shown in the drawings, and that it is desired to put the car in motion in a forward direction and bring it up to top speed, the operator will first push the reversing valve lever 34 forward, i. e. to the left as viewed in Fig. 1. Next he moves the control valve lever 33 rearwardly to bring the valve into first speed position as shown in full lines in Fig. 20. So long as the control valve is in the position shown in Figs. 8 and 9, the return passage 62 is closed by brake piston 61. Motor 21 will be running at idling speed, driving pump 23, but the discharge of pump 23 will be bypassed through the control valve 35, as indicated by the arrows in Fig. 8, whence it flows via passage 93, Fig. 6, into suction manifold 43 for direct return to the pump 23 without passing through the motors. Now as the control valve is moved to neutral position as shown by the full lines in Fig. 19, the braking action is released so that, if the car were on a down grade, the resultant driving action of the wheels on the rails would start to turn motors 28 which would then be acting as pumps, discharging through passage 62 into the end of the chamber of the control valve into conduit 30 through cooler 39, conduit 31, manifold 43, to the pump. As the control valve is moved into first speed position as shown by the full lines in Fig. 20, piston 60 uncovers the connection to discharge conduit 40 from one of the three cylinder sections of pump 23. Then as motor 21 is accelerated, high pressure fluid from passage 40 forces its way through passage 81, pump relief valve 36, passage 82 and reversing valve 37 into conduit 26 to begin to drive motors 28 in the forward direction which has already been selected through positioning of reversing valve lever 34 as described. Now as the car picks up speed, the operator moves the control valve lever to bring the valve into the second speed position shown by the dash lines in Fig. 20, so that two of the cylinders of the pump are acting on the motors and the discharge of the one remaining cylinder is being by-passed. I. e. high pressure fluid from passages 40 and 41 pass through the control valve into the motor driving system, while that from passage 42 is by-passed back into the suction manifold of the pump.

Third speed position is shown by the dotted lines in Fig. 20, and when this position is reached all of the cylinders of the pump are discharging into the motor driving circuit so that no fluid is being by-passed. As the control valve is being moved across the ends of passages 41 and 42, piston 60 is brought into positions in which it would block the flow of fluid altogether except for the fact that the auxiliary relief valve 65 is provided in conjunction with chamber 63 in passages 64 of piston 60. As the piston passes the intersection of passage 41 or 42 with the valve chamber, the port is not blocked, because the fluid under pressure can pass through opening 64 into chamber 63 and is permitted to discharge by pushing relief valve 65 outwardly against the action of compression spring 66, whence the fluid thus escaping enters passage 81 of the motor driving circuit. If at any time during the period of acceleration and shifting of the control valve through its various positions, the pressure in the motor driving system builds up too rapidly, the pump relief valve 36 automatically comes into operation. Because of the differential in the sizes of pistons 84 and 85, this valve begins to move against the action of spring 88 when the pressure reaches a predetermined amount determined by the initial compression on spring 88 as adjusted by screw 89. This movement is to the left as viewed in Figs. 8 and 19, uncovering by-pass passage 93 which leads into suction manifold 43. If pressure within the pump relief valve builds up sufficiently high, this valve may move to an extent sufficient to uncover also by-pass 94.

In applying the brake—i. e. moving the control valve into its braking position—the brake or motor relief valve 38 is brought into operation. It works on the same differential pressure principle as has been described with reference to pump relief valve 36. As pressure builds up in valve 38 due to closing of passage 62 by brake piston 61, the valve will move to the left as viewed in Figs. 9 and 19, the extent of this movement depending upon the sharpness of the braking action and the extent of preloading of the compression spring 88', as determined by the adjustment which has been described. The movement of this valve will uncover the by-pass passage 95, permitting the pressure to be relieved by returning part of the fluid to the suction side of the pump 23. In this way a constant pressure is maintained on the discharge line from the motors, thus assuring a smooth uniform braking action. In the event the car is running forward and the operator should happen to throw the brakes on and at the same time throw the car into reverse, relief valve 38 would move sufficiently to open a second by-pass 96, thus further relieving the braking action. The valve may be so designed and adjusted for example that 200 lbs. additional pressure would be required for this action.

*The power converter improvements*

Reference has been made to the features of blending the action of the pistons and the cutback at the cylinder porting to reduce pulsation in hydraulic pumps, motors, and transmissions. These features will now be described with particular reference to Figs. 10 to 18 inclusive. In the general construction of the type of rotary abutment unit selected for purposes of illustrating the invention, the pump or motor is built up of a series of plate-like housing members. Thus the pair of motors 28, as previously indicated, may be arranged back to back as shown in Fig. 10. Each motor comprises the plate-like housing members 97, 98, 99 with end plates 100 and 101 to hold the bearings and glands for the motor shafts. Details such as the bearings and glands are clearly shown in Fig. 10, and as these are elements of conventional construction, it will be unnecessary to describe them here. The several housing members and end plates are clamped together as by means of tie-rods 102 passing through aligned openings in these members or through aligning sleeves 103. Housing members 97, 98 and 99 have aligned openings to receive the shafts 104 which drive the wheels of the car through the couplings 32 (Fig. 2). The housing members also have openings to receive piston rotor shafts 105 whose axes are spaced from and parallel to shafts 104. End plates 100 are recessed at 106 to form a housing for pinions 107 fixed to piston rotor shafts 105 for engagement with gear 108 fixed to shaft 104. In the embodiment shown, the driving ratio between pinions 107 and gear 108 is 1:1. As best shown in Fig. 11, housing member 98 is formed with cylindrical bores 109 intersecting the opening for rotary abutment 110 fixed to shaft 104. Piston rotors 111 fixed to shafts 105 have pistons 112 slidably engaging the surfaces of bores 109 and rotatable in the annular cylinders 113 formed between housing members 97, 98 and 99 and piston rotors 111. Annular cylinders 113 are connected by a fluid passage 114 extending through housing member 98 and around abutment rotor 110. The abutment rotor has a recess 115 to clear the pistons 112 as they pass the abutment. Fluid passages 116, 117 are connected to the inlet-outlet conduits 25, 26 through manifold 27. Considering operation in a forward direction, high pressure fluid from the control unit previously described enters the motor through passage 117 from which it is discharged through port 118 into annular cylinder 113 driving the piston rotor in the clockwise direction indicated by the arrow. Fluid discharged from the lower annular cylinder 113 in Fig. 11 flows through connecting passage 114 into the upper annular cylinder where it drives the second piston rotor—also in the clockwise direction indicated by the arrow. The low pressure fluid is discharged from the second annular cylinder 113 at port 119 and flows through passage 116 into the manifold 27 for return to the pump via the control unit in the manner which has been described. When the control unit is set for reverse operation, the operation of the motor is reversed, fluid entering through passage 116 and leaving through passage 117, and driving the piston rotors in the opposite or counter-clockwise direction. In either case the shafts 104 are of course driven through the gearing 107, 108.

The construction of the pump 23 is the same as that of the motor except that several pairs of annular cylinders are provided in spaced axial alignment, the number depending upon the number of speeds or torque ratios provided by the control unit, for example three in the case of the control unit which has been described.

In Fig. 11 the piston 112 of the lower cylinder is about to emerge from the cylinder while the piston of the other cylinder has just been received within its cylinder. Thus the one piston takes up its working stroke just as the other finishes its working stroke, so that we might say that one piston is always valving the other piston. With this construction each piston does half of the work, or at least the arrangement is such that the work is divided between the two pistons, so that at any given moment only one of the pistons is fully effective. Another way of stating this would be to say that the fully effective working strokes of the two pistons add up to substantially 360°. This feature is of vital importance in eliminating or substantially reducing pulsation in the operation of the unit either as a motor or as a pump. Each of the pistons 112 has a sealing surface 120 movable in contiguous relationship to the surface 109 of its annular cylinder to provide a substantial surface sealing area therebetween, the pistons and the connected inlet and outlet 114 being constructed and arranged as follows: with the piston of one annular cylinder in a position in which its sealing surface is contiguous to a surface of its annular cylinder and with the leading edge of the piston opposite the edge of the outlet, the piston of the other annular cylinder is in a position in which its sealing surface is contiguous to a surface of its annular cylinder and with the trailing edge of the piston opposite the edge of the inlet so that the piston of one of the cylinders begins to lose its full sealing effectiveness over its surface sealing area just as the piston of the other cylinder acquires its full sealing effectiveness over its surface sealing area. The result of this is that the action of the two pistons is blended to reduce pulsation to a considerable extent, or to virtually eliminate it. The arrangement is such that the one piston emerges from, or begins to unseal, its cylinder substantially at the moment that the other piston is fully received within its cylinder.

This blending action will now be described in further detail with reference to the diagrammatic views of Figs. 12 to 15 inclusive, and Figs. 16, 17 and 18. In accordance with my invention the connection from one cylinder to the connecting fluid passage 114 is relieved by a small cut-back 121 over a portion of the contiguous sealing surfaces of the piston and cylinder so that the action of the piston as it leaves its cylinder is smoothed out to reduce pulsation further. This has the effect of extending the angular displacement of the piston between the point at which opening of the connection between the cylinder and passage begins to take place and the point at which full opening is reached. The cut-back 121 may be formed as a narrow tapering channel in the surface of the cylinder as shown in Figs. 12 to 16, or it may be formed in the surface of the piston as shown at 123 in the modified construction illustrated in the detail views, Figs. 17 and 18, or a cut-back may be formed in both the surface of the cylinder and in the surface of the piston. Also, a similar cut-back 122 may be provided for the outlet of each of the cylinders. The manner in which this cut-back at the cylinder porting operates to smooth out the action of the piston as it leaves its cylinder will now be explained further with reference to the comparative diagrammatic views, Figs. 12, 13 and 14, 15. In Fig. 12 the piston of the lower cylinder is in the position in which it is about to emerge from its cylinder at the conclusion of a power stroke. Fig. 13 shows the position of the parts slightly advanced so that the piston of the lower cylinder has just reached the point at which the outlet of that cylinder is fully open and in communication with the fluid passage 114 connecting the outlet to the inlet of the other cylinder. Thus the porting action extends substantially for the entire angular movement which occurs between the respective positions shown in Figs. 12 and 13, this angle being indicated in Fig. 13 at $a$.

Now turning to the comparative views of Figs. 14 and 15, we find that the opening of the port in the absence of the cut-back feature extends for the much smaller angular displacement shown at $b$ in Fig. 15. Fig. 14, like Fig. 12, shows the piston of the lower cylinder in emerging position, whereas Fig. 15, like Fig. 13, shows the same piston at the point at which the outlet of the cylinder is fully open. Now, comparing Fig. 13 with Fig. 15, it will be seen that angle $a$ is substantially greater than angle $b$, indicating that for a given speed of rotation the opening of the port between the one cylinder and the connecting passage to the other cylinder extends over a longer interval of time. Thus the opening of the port occurs with less suddenness, and the tendency toward pulsation is correspondingly reduced. Cut-back porting 122 has a similar effect, and the blending of the action of the pistons of the two cylinders will be effective for either the forward or reverse directions of operation of the power converter, whether operating as a pump or as a motor.

The terms and expressions which I have employed are used in a descriptive and not a limiting sense, and I have no intention of excluding such equivalents of the invention described, or of portions thereof, as fall within the purview of the claims.

I claim:

1. In an hydraulic device of the class described, a casing having a plurality of annular cylinders each of which has a fluid inlet and a fluid outlet, a shaft disposed centrally with respect to each of the annular cylinders, a piston slidably received in each of said annular cylinders and fixed to the shaft disposed centrally thereof, a cylindrical abutment with a recess to clear each of said pistons, and a fluid passage connecting the outlet of one cylinder to the inlet of another cylinder of cross-sectional area substantially equal to the first, the piston of each of the annular cylinders so connected having a sealing surface movable in contiguous relationship to a surface of its annular cylinder to provide a substantial surface sealing area therebetween, the pistons and the connected outlet and inlet being constructed and arranged as follows: with the piston of said one annular cylinder in a position in which its sealing surface is contiguous to a surface of its annular cylinder and with the leading edge of the piston opposite the edge of the outlet, the piston of said other annular cylinder is in a position in which its sealing surface is contiguous to a surface of its annular cylinder and with the trailing edge of the piston opposite the edge of the inlet so that the piston of said one annular cylinder begins to lose its full sealing effectiveness over its said surface sealing area just as the piston of said other annular cylinder acquires its full sealing effectiveness over its said surface sealing area whereby the action of said two pistons is blended to reduce pulsation substantially.

2. In a hydraulic device of the class described, a casing having two annular cylinders each of which has a fluid inlet and a fluid outlet, a shaft disposed centrally with respect to each of the annular cylinders, a piston slidably received in each of said annular cylinders and fixed to the shaft disposed centrally thereof, and a cylindrical abutment with a recess to clear each of said pistons, the annular cylinders being of substantially equal cross-sectional area and having the outlet of one connected to the inlet of the other by a fluid passage, each of the pistons having a sealing surface movable in contiguous relationship to a surface of its annular cylinder to provide a substantial surface sealing area therebetween, the pistons and the connected outlet and inlet being constructed and arranged as follows: with one of said pistons in a position in which its sealing surface is contiguous to a surface of its annular cylinder and with a leading edge of the piston opposite the edge of the outlet, the other piston is in a position in which its sealing surface is contiguous to a surface of its annular cylinder and with the trailing edge of the piston opposite the edge of the inlet so that said one piston begins to unseal its cylinder substantially at the moment that said other piston has been brought into full sealing relationship with its cylinder whereby the action of the two pistons is blended to reduce pulsation.

3. A hydraulic power converter having a casing with two coplanar annular cylinders each with a fluid inlet and a fluid outlet, a shaft disposed centrally with respect to each of the annular cylinders, a piston slidably received in each of said annular cylinders and fixed to its respective shaft, and a cylindrical abutment arranged between the two cylinders, said abutment having a recess to clear each of said pistons in turn, the annular cylinders being of substantially equal cross-sectional area and having the outlet of one connected to the inlet of the other by a fluid passage, each of the pistons having a sealing surface movable in contiguous relationship to a surface of its annular cylinder to provide a substantial surface sealing area therebetween, the pistons and the connected outlet and inlet being constructed and arranged as follows: with one of said pistons in a position in which its sealing surface is contiguous to a surface of its annular cylinder and with a leading edge of the piston opposite the edge of the outlet, the other piston is in a position in which its sealing surface is contiguous to a surface of its annular cylinder and with the trailing edge of the piston opposite the edge of the inlet so that said one piston begins to unseal its cylinder substantially at the moment that said other piston has been brought into full sealing relationship with its cylinder whereby the action of the two pistons is blended to reduce pulsation.

4. In a hydraulic device of the class described, a casing having a plurality of annular cylinders each of which has a fluid inlet and a fluid outlet, a shaft disposed centrally with respect to each of the annular cylinders, a piston slidably received in each of said annular cylinders and fixed to the shaft disposed centrally thereof, a cylindrical abutment with a recess to clear each of said pistons, and a fluid passage connecting the outlet of one cylinder to the inlet of another cylinder of cross-sectional area substantially equal to the first, the pistons and the connected outlet and inlet being so arranged relative to one another that the piston of said one cylinder begins to unseal its cylinder substantially at the moment that the piston of said other cylinder has fully sealed its cylinder, and the connection from one cylinder to said connecting fluid passage being relieved by a small cut-back over a portion of the contiguous sealing surfaces of the piston and cylinder which reduces the extent of the sealing contact between said contiguous sealing surfaces, whereby the action of the two pistons is blended and the action of the piston at said cut-back is smoothed out as it leaves its cylinder to reduce pulsation.

5. A hydraulic power converter having a casing with two coplanar annular cylinders each with a fluid inlet and a fluid outlet, a shaft disposed centrally with respect to each of the annular cylinders, a piston slidably received in each of said annular cylinders and fixed to its respective shaft, and a cylindrical abutment arranged between the two cylinders, said abutment having a recess to clear each of said pistons in turn, the annular cylinders being of substantially equal cross-sectional area and having the outlet of one connected to the inlet of the other by a fluid passage, the connection of said outlet to said fluid passage being relieved by a small cut-back over a portion of the contiguous sealing surfaces of the piston and cylinder which reduces the extent of the sealing contact between said contiguous sealing surfaces, whereby the action of the piston at said cut-back is smoothed out to reduce pulsation and blend the action of the two pistons.

6. In an hydraulic device of the class described, a casing having a plurality of annular cylinders each of which has a fluid inlet and a fluid outlet, a shaft disposed centrally with respect to each of the annular cylinders, a piston slidably received in each of said annular cylinders and fixed to the shaft disposed centrally thereof, a cylindrical abutment with a recess to clear each of said pistons, and a fluid passage connecting the outlet of one cylinder to the inlet of another cylinder of cross-sectional area substantially equal to the first, the piston of each of the annular cylinders so connected having a sealing surface movable in contiguous relationship to a surface of its annular cylinder to provide a substantial surface sealing area therebetween, the connection of said outlet to said fluid passage being relieved by a small cut-back over a portion of the contiguous sealing surfaces of the piston and cylinder which reduces the extent of the sealing contact between said contiguous sealing surfaces, whereby pulsation is reduced and the action of the two pistons is blended.

7. In an hydraulic device of the class described, a casing having a plurality of annular cylinders each of which has a fluid inlet and a fluid outlet, a shaft disposed centrally with respect to each of the annular cylinders, a piston slidably received in each of said annular cylinders and fixed to the shaft disposed centrally thereof, a cylindrical abutment with a recess to clear each of said pistons, and a fluid passage connecting the outlet of one cylinder to the inlet of another cylinder of cross-sectional area substantially equal to the first, the piston of each of the annular cylinders so connected having a sealing surface movable in contiguous relationship to a surface of its annular cylinder to provide a substantial surface sealing area therebetween, the connection of said outlet to said fluid passage being relieved by a small cut-back over a portion of the contiguous sealing surfaces of the piston and cylinder which reduces the extent of the sealing contact between said contiguous sealing surfaces whereby pulsation is reduced.

8. An hydraulic device as defined by claim 4 in which said cut-back at the contiguous sealing surfaces of the piston and cylinder is tapered in width to produce a gradual opening of the connection between the cylinder and connecting passage and to extend the angular displacement of the piston between the point at which opening begins and that at which full opening is reached.

9. An hydraulic device as defined by claim 4 in which said cut-back consists of a tapered channel in the casing.

10. An hydraulic device as defined by claim 4 in which said cut-back consists of a tapered channel in the piston.

FRANK BERRY.

REFERENCES CITED

The following references are of record in the file of this patent:

UNITED STATES PATENTS

| Number | Name | Date |
|---|---|---|
| 655,198 | Code | Aug. 7, 1900 |
| 935,079 | Wheeler | Sept. 28, 1909 |
| 1,485,414 | Junkers | Mar. 4, 1924 |
| 2,344,879 | Johnson | Mar. 21, 1944 |
| 2,483,705 | Levetus et al. | Oct. 4, 1949 |
| 2,497,373 | Richards, Jr. | Feb. 14, 1950 |

FOREIGN PATENTS

| Number | Country | Date |
|---|---|---|
| 185,805 | Germany | July 1, 1907 |
| 420,880 | Great Britain | Dec. 10, 1934 |
| 543,555 | Great Britain | Mar. 3, 1942 |
| 617,955 | Germany | Aug. 29, 1935 |